Aug. 22, 1933.    M. PAYNE    1,923,998
THERMOSTATIC AND LIKE TEMPERATURE RESPONSIVE APPARATUS
Filed Dec. 31, 1930
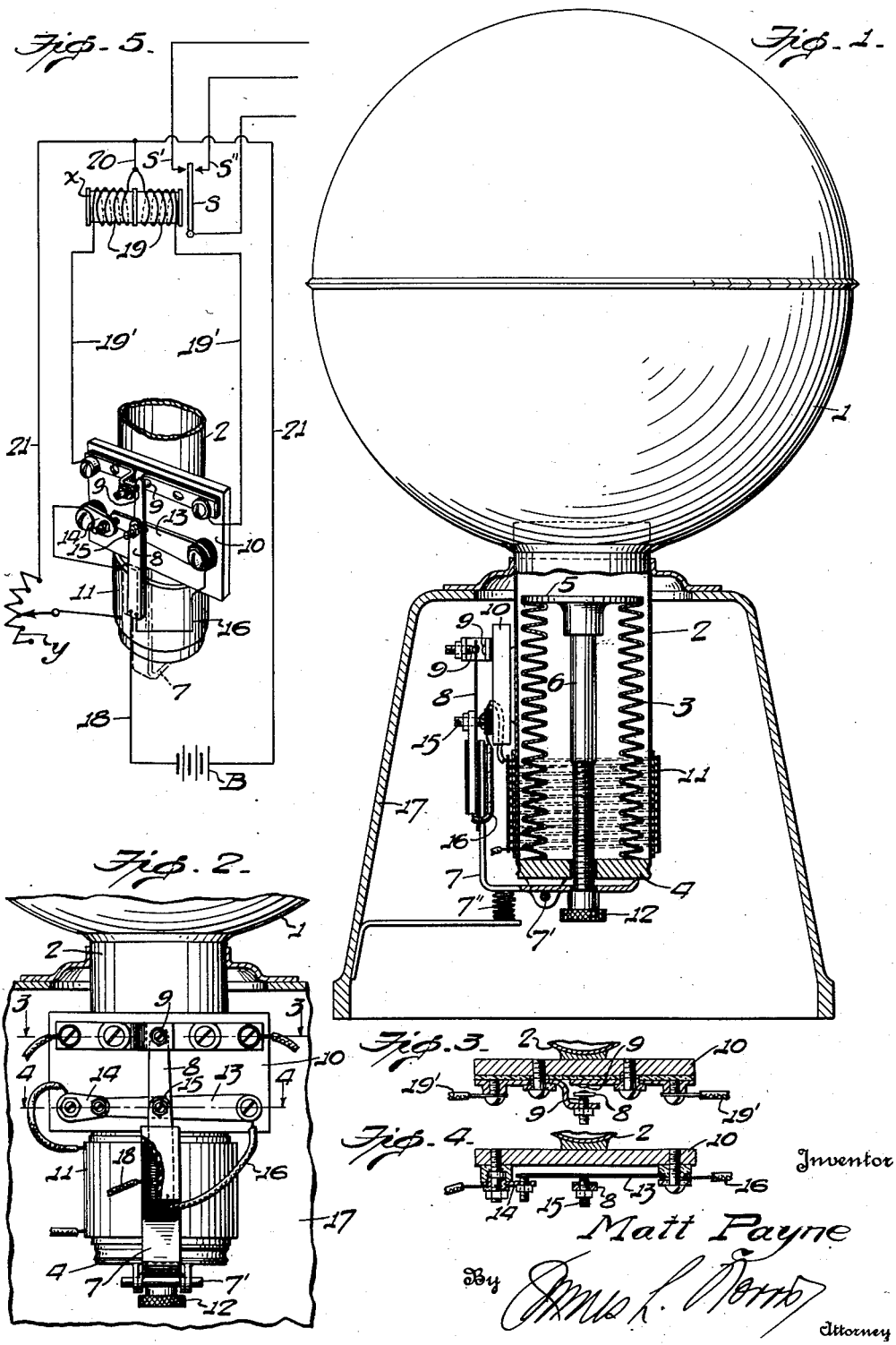
Inventor
Matt Payne
By
Attorney Patented Aug. 22, 1933

1,923,998

UNITED STATES PATENT OFFICE 1,923,998

THERMOSTATIC AND LIKE TEMPERATURE RESPONSIVE APPARATUS

Matt Payne, Surbiton, England

Application December 31, 1930, Serial No. 505,901, and in Great Britain January 9, 1930

6 Claims (Cl. 236—68)

The object of the present invention is to provide a thermostat or temperature sensitive relay of the volatile liquid type which will operate promptly after a change in temperature of the surrounding atmosphere. According to the invention, said object is accomplished by providing an electric heating element which imparts heat to the volatile medium at a predetermined and uniform rate so that the temperature of the volatile medium is always higher than the temperature of the surrounding medium. Continual evaporation from the surface of the volatile medium occurs owing to the continual supply of heat to such medium by the electrical heating element.

In known apparatus the liquid and vapour phases of the volatile medium remain in a state of equilibrium so long as the surrounding temperature remains constant, but when the surrounding temperature changes a new condition of equilibrium between the liquid and vapor phases must be established by evaporation or condensation of a portion of the medium. In order that evaporation and condensation may proceed equally rapidly in relation to a given rise or fall in the surrounding temperature it is necessary that both the liquid and vapour phases should be in equally good heat exchanging relationship with their surroundings, and this obviously sets a limit to the degree to which the total mass of the volatile medium can be reduced in relation to the total heat exchanging surface provided, since an undue reduction in the volume of the liquid phase will reduce the area of liquid surface available for taking up heat.

The principal object of the present invention is to provide apparatus in which only a small quantity of heat energy in proportion to the surface area available for heat exchange need be gained or lost in order to raise or lower the vapour pressure to a given extent, with the result that the apparatus can be made to respond very quickly to change of temperature.

According to the invention the vessel, whose walls are exposed to the temperature which is to be regulated or whose variations are to be indicated, is filled with vapour, the pressure of which is maintained in a state of dynamic equilibrium with a small body of heated liquid by continual evaporation from the surface of such heated liquid and by continual condensation of the vapor on the walls of the vessel so that variations in the surrounding temperature which is to be regulated or whose variations are to be indicated cause variations in the equilibrium between the vapour pressure and the liquid, which latter variations are effective to move a switch or valve element.

The essential advantage of this arrangement is that the volume of liquid present in the system may be very small in proportion to the effective heat exchanging surface provided by the walls of the vessel, thus removing the limitation characteristic of known apparatus and making the apparatus very sensitive to small variations in the temperature of the surrounding atmosphere.

In order that the invention may be readily understood reference will now be made to the accompanying drawing which illustrates a preferred embodiment of the invention and in which:—

Figure 1 is an elevation partly in section,

Figure 2 is an elevation taken at a right angle to Figure 1, portions of the spherical vessel and supporting base being broken away.

Figure 3 is a horizontal section on the line 3—3, Figure 2, of the upper part of the electric circuit controlling means, Figure 4 is a view, similar to Figure 3, on the line 4—4, Figure 2, of the lower portion of the electric circuit controlling means, and Figure 5 is a perspective view of a portion of the apparatus and indicating diagrammatically the various electric circuits controlled thereby.

In the apparatus shown in the drawing the temperature sensitive part of the apparatus consists of a bulb or spherical vessel 1 of thin sheet metal supported by a hollow base 17. A hollow sheet metal tubular body 2, which communicates at its upper end with the interior of the spherical vessel 1, depends from said vessel into the hollow base 17.

A flexible sealing element in the form of a metallic bellows 3 located within the tubular body 2 is secured at its lower end to a bottom plate 4 which closes the lower end of the tubular body and is connected at its upper end to a plate 5 carried by a spindle 6, which projects through an opening in the plate 4 and is attached at its lower end to a switch arm 7 pivoted at 7' to plate 4. The switch arm consists of a bell crank lever carrying a flexible contact strip 8, insulated from the switch arm 7 and whose free end lies between two fixed contacts 9 carried by insulated supports on a plate 10 fixed to the tubular body 2.

An electrical resistance heating element 11 is mounted on the body 2 near the lower end thereof for the purpose of heating a volatile liquid contained in the annular space between the bellows 3 and the cylindrical wall of the body 2, which heating element, so long as electrical current flows therethrough, will evaporate the liquid in the body 2 and produce vapour pressure in the bulb 1 which acts through the plate 5 and spindle 6 upon the switch arm 7.

The screw-threaded lower end of the spindle 6 extends through an opening in the switch arm 7 and carries a thumb nut 12 which bears against the outer side of the switch arm for adjusting the switch arm relatively to the spindle and a suitable spring 7'' acting on the switch arm is provided for the purpose of pressing the switch arm against the nut 12.

The contact strip 8 is connected by a conductor 18 to one side of a source of electrical current B and through a second conductor 16 with an auxiliary contact spring 13, mounted on the plate 10 and insulated therefrom. The contact spring 13 normally engages a fixed contact 14 which is electrically connected with one side of the heating element 11, the other side of said heating element being electrically connected by a conductor 21 to the other side of the source of electrical current B. A variable resistance $y$ may be placed in the conductor 21 between the heating element 11 and source of electrical current for regulating the flow of current through said element and thus regulating the supply of heat to the body 2.

The switch arm 7 carries a pin or projection 15 which is directed toward the contact spring 13 and is adapted, under the conditions to be set forth later, to engage and move the contact spring 13 out of engagement with the contact 14 and thereby break the electrical circuit to the heating element 11. When the temperature surrounding the vessel 1 rises above a predetermined degree the vapor pressure in said vessel will be caused to increase to such a degree as to move the plate 5 outwardly of the vessel 1. This movement of the plate 5 will, through the spindle 6, permit the switch arm 7 to rock in a direction to shift the contact strip 8 from the fixed contact 9 with which it has been in engagement to the other fixed contact 9, that is to say, from the left hand contact 9 to the right hand contact 9, Figure 1, and thus break the electrical circuit to one of the windings 19 of the solenoid $x$ and close the electrical circuit to the other winding 19 of said solenoid. During this movement of the switch arm 7, said arm will not rock far enough to cause the projection 15 to engage and move the contact spring 13 out of engagement with the contact 14. But if the temperature surrounding the vessel 1 rises high enough to create sufficient vapor pressure in the vessel 1 to permit the switch arm 7 to rock further than necessary to merely shift the contact strip 8 from the left hand fixed contact 9 to the right hand fixed contact 9 (Figure 1), the pin or projection 15 will engage the contact spring 13 and move the same out of engagement with the contact 14, thus breaking the electric circuit to the heating element 11.

As the temperature surrounding the vessel 1 falls the vapor in said vessel will be condensed sufficiently to reduce the vapor pressure in said vessel enough to permit the switch arm 7 to rock in the opposite direction far enough to move the pin or projection 15 out of engagement with the contact spring 13 and permit said spring to reengage the contact 14. When the vapor pressure in the vessel 1 is reduced to the normal degree the switch arm 7 will be permitted to rock further and shift the contact strip 8 away from the contact 9 with which it has been in engagement into engagement with the other fixed contact 9.

The apparatus described is intended to control a differential relay $x$ in response to variations in the temperature surrounding the bulb 1 and may be connected to the electrical apparatus in the following manner. The fixed contacts 9 are connected through the two windings 19 of said differential relay $x$ by conductors 19' to the conductor 20 and return lead 21 to the battery. Relay solenoid $x$ moves the switch $s$ in opposite directions, according to which winding 19 is energized, for engagement with and disengagement from contacts $s'$ and $s''$ in control circuit means $t$ for a heater or other auxiliary device.

The apparatus is mounted on a base 17 which encloses the tubular body 2 and carries suitable external terminals (not shown) providing for electrical connection to the necessary external electrical apparatus.

The sealed vessel formed by the bulb 1 and body 2 is charged with a small quantity of liquid which collects in the tubular body 2. When current is supplied to the heating element 11 the liquid in the body 2 will be heated to a temperature above the temperature of its surroundings so that there will be continual evaporation at the liquid surface and increase of vapor pressure in the bulb 1. This evaporation will be balanced by condensation of vapor which will occur at the surface of the bulb 1, and if the temperature surrounding the bulb 1 remains uniform for a short length of time the vapour pressure within the bulb 1 will quickly attain such a value that the rate of condensation at the surface of the vapour space will be equal to the rate of evaporation from the surface of the liquid. As soon as a change takes place in the temperature surrounding the bulb 1, the rate of loss of heat through the walls of the vapour space, and therefore the rate of condensation of vapor on the wall of the bulb, will change until the resultant change in the vapour pressure within bulb 1 reestablishes a condition of equilibrium between such pressure and the liquid in the space between the tubular body 2 and the bellows 3. The pressure acting on the plate 5 will therefore vary in accordance with the temperature surrounding the bulb 1.

By suitable regulation of the heater 11 and of the pressure of supplied to the heater 11 and of the pressure of the switch arm 7 on the spindle 6, the critical point at which the contact spring 8 will move from one of the contacts 9 to the other can be made to correspond to the temperature which it is desired shall surround the bulb 1. If the temperature surrounding the bulb 1 rises excessively above that desired, the pressure of the vapor in the bulb 1 will be increased and the supply of electric current to the heating element 11 will be automatically broken by the breaking of the connection between the elements 13 and 14. When the temperature surrounding the bulb falls, the element 13 will re-engage the contact 14 and the supply of electric current to the heating element will be switched on again before the contact spring 8 shifts its position from one of the contacts 9 to the other, so that the relay $x$ will not be operated to indicate falling temperature until the temperature of the air or gas surrounding the bulb 1 has fallen below that desired.

The apparatus may be used for many different purposes as a thermostatic switch or temperature indicator. Owing to the small changes of temperature required to operate it, it is quickly responsive to radiant heat as well as to changes in the temperature of the surrounding air or gas. As the vapour pressure within the bulb depends essentially upon the rate of heat exchange between the bulb 1 and the atmosphere surrounding it, air currents and other disturbances which would produce a sensation of cold for an animal or human being will cause a corresponding fall in the vapour pressure in the bulb, even when the actual temperature of the air does not change. The apparatus is therefore particularly valuable as a means of controlling apparatus for generating radiant heat in halls and large buildings. For this purpose one or more apparatus constructed according to the present invention and arranged to control the radiant heaters through suitable relays, may be so located in the hall or building to be heated that each such apparatus is under the influence of at least one of the radiant heaters which it controls. The vapour pressure in the bulb of each apparatus will then depend partly on the temperature and movement of the surrounding air or gas and partly on the intensity of the radiant heat falling on the bulb. Any change of temperature or air movement such as would produce a sensation of cold for a human being will produce practically instantaneously a compensating increase in the intensity of the radiant heat necessary to maintain the critical vapour pressure in the bulb of the thermostat. By suitable adjustment the apparatus may therefore be arranged to maintain a supply of radiant heat so regulated in relation to the condition of the air in the hall or building as to render the building uniformly comfortable in spite of the changing conditions of air temperature and movement.

The bulb 1 will lose heat by convection to the surrounding air or gas and may also radiate heat to the walls of the enclosing chamber. The surface of the bulb may be blackened to increase the sensitivity of the apparatus to radiant heat.

Obviously the contacts 9 may be connected to any type of differential relay or other electrical apparatus for indicating temperature changes or for controlling the operation of heating apparatus for the purpose of maintaining a constant temperature at the bulb 1.

Assuming that the apparatus is to be used for maintaining a given temperature in a room or other enclosure by controlling a radiant heater, the resistance $y$ is so adjusted and the switch arm 7 is so adjusted by means of the nut 12 relatively to the spindle 6 that the heat supplied by the heating element 11 to the body 2 will evaporate the liquid in said body at such rate that the vapor evolved from such liquid and collecting in the bulb 1 will be condensed at such a rate that the pressure exerted by the vapor in the bulb 1 on the plate 5 will, through the spindle 6, permit the switch arm 7 to assume a position with the contact strip 8 in engagement with one of the contacts 9 and the contact strip 13 in engagement with the contact 14. Electric current flowing through the conductor 18, contact strip 8, one of the conductors 19', and solenoid $x$ will hold the switch S in engagement with one of the contacts $s'$ or $s''$ and thus cause the radiant heat apparatus which is controlled by said switch to produce the desired degree of heat. Electric current will also flow from the contact strip 8, through the conductor 16, contact strip 13, contact 14, heating element 11, resistance $y$, and conductor 21. The heating element 11 will heat the liquid in the body 2 to such a degree that the vapor evolved therefrom and collecting in the bulb 1 will be condensed by the air surrounding said bulb at such a rate that the pressure of such vapor on the plate 5 will hold the switch arm 7 in the position just mentioned.

If the temperature in the room or enclosure rises above the desired degree, the rate of condensation of the vapor in the bulb 1 will decrease and the pressure of such vapor on the plate 5 will increase. This increase of pressure, acting upon the plate 5, will, through the spindle 6, permit the switch arm 7 to rock far enough to shift the contact strip 8 away from the contact 9 with which it has been in engagement into engagement with the other contact 9 but not far enough to cause the projection 15 to bear against and move the contact strip 13 out of engagement with the contact 14. Electric current will then flow through the other conductor 19', contact strip 8, and solenoid $x$ to shift the switch S into contact with its other contact $s'$ or $s''$ to reduce the heat produced by the radiant heat apparatus. If the temperature surrounding the vessel 1 rises excessively the vapor pressure in said vessel will be caused to rise excessively and this pressure, acting upon the plate 5, will permit the switch arm 7 to rock further and cause the projection 15 to engage and move the contact strip 13 out of engagement with the contact 14 so as to break the electric circuit to the heating element 11. When the temperature surrounding the vessel 1 has dropped to the desired degree the switch arm 7 will be permitted to rock in the other direction to first move the projection 15 out of engagement with the contact strip 13 and to then shift the contact strip 8 back to its normal position.

I claim:

1. Apparatus of the kind referred to comprising a vessel whose walls are adapted to be exposed to the surrounding atmosphere, a small body of liquid in said vessel, heating means for said liquid whereby the vessel is filled with vapor which is maintained in a state of dynamic equilibrium by continual evaporation and continual condensation on the walls of the vessel in such a manner that variations in the temperature of the atmosphere surrounding said vessel cause variations in the equilibrium vapor pressure, and means to control an auxiliary device through the variations in said vapor pressure.

2. Apparatus according to claim 1 wherein the vessel consists of a sealed bulb having a liquid chamber, and said heating means comprises an electric heater designed to impart heat energy to the liquid at a definite uniform rate.

3. Apparatus according to claim 1 wherein means are provided for switching off the heating means when the temperature of the atmosphere surrounding the vessel rises excessively.

4. Apparatus of the kind referred to comprising a closed vessel, a liquid partially filling said vessel, control means for an auxiliary device operable through variations in pressure within said vessel, heating means to evaporate said liquid, said heating means being inactive above a predetermined temperature of the atmosphere about the vessel, and means to render said heating means operative through movement of the control means when said atmospheric temperature falls.

5. Apparatus of the kind referred to comprising a closed vessel, a liquid partially filling said vessel, control means for an auxiliary device operable through variations in pressure within said vessel, electric heating means to evaporate said liquid inactive above a predetermined temperature of the atmosphere about the vessel, a switch in the circuit of said heating means open above said temperature, and means to close said switch through movement of the control means when said atmosphere falls below said temperature.

6. Apparatus of the kind referred to, comprising a bulb adapted to be exposed to the surrounding atmosphere, a tubular extension depending from said bulb, flexible bellows extending into said extension and closing the lower end thereof, said bellows forming with said extension a container for liquid, a plate sealing the upper end of said bellows and subject to the vapor pressure in said bulb, means for supplying heat at a uniform rate to said container whereby said bulb is kept filled with vapor in a state of dynamic equilibrium with the liquid in said container, a spindle depending from said plate, and means actuated by the movement of said spindle for controlling an auxiliary device.

MATT PAYNE.